US00RE43983E

(19) United States
(12) Reissued Patent
Palmese et al.

(10) Patent Number: US RE43,983 E
(45) Date of Reissued Patent: Feb. 5, 2013

(54) MULTI-MODAL VINYL ESTER RESINS

(75) Inventors: Giuseppe Raffaello Palmese, Hainesport, NJ (US); John Joseph La Scala, Bear, DE (US); James Matthew Sands, Kingsville, MD (US)

(73) Assignees: Drexel University, Philadelphia, PA (US); The United States of America as Represented by the Secretary of the Army, Washington, DC (US)

(21) Appl. No.: 12/943,598

(22) Filed: Nov. 10, 2010

Related U.S. Patent Documents

Reissue of:
(64) Patent No.: 7,449,525
Issued: Nov. 11, 2008
Appl. No.: 11/568,600
PCT Filed: May 6, 2005
PCT No.: PCT/US2005/016005
§ 371 (c)(1),
(2), (4) Date: May 17, 2007
PCT Pub. No.: WO2005/118657
PCT Pub. Date: Dec. 15, 2005

U.S. Applications:
(60) Provisional application No. 60/569,379, filed on May 7, 2004.

(51) Int. Cl.
*C08F 222/10* (2006.01)

(52) U.S. Cl. ..... 525/454; 525/329.5; 525/463; 526/72; 526/317.1; 526/318.5; 526/346

(58) Field of Classification Search ..... 526/317.1, 526/346; 525/454, 463
See application file for complete search history.

(56) References Cited

U.S. PATENT DOCUMENTS

| | | | | |
|---|---|---|---|---|
| 3,125,592 | A | 3/1964 | Nevin | |
| 3,224,989 | A | 12/1965 | Nevin | |
| 3,256,225 | A | 6/1966 | Nevin | |
| 3,291,764 | A | 12/1966 | Findley | |
| 3,450,613 | A | 6/1969 | Steinberg | |
| 3,637,618 | A | 1/1972 | May | |
| 3,676,384 | A | 7/1972 | Rheineck et al. | |
| 3,828,608 | A | 8/1974 | Yamamoto | |
| 3,878,077 | A | 4/1975 | Borden et al. | |
| 3,931,075 | A | 1/1976 | Trecker et al. | |
| 3,979,270 | A | 9/1976 | Trecker et al. | |
| 4,025,477 | A | 5/1977 | Borden et al. | |
| 4,254,351 | A | 3/1981 | Smith | |
| 4,347,343 | A | 8/1982 | Brewbaker | |
| 4,359,370 | A * | 11/1982 | De La Mare et al. | 528/112 |
| 4,438,228 | A | 3/1984 | Schenck | |
| 4,740,367 | A | 4/1988 | Force et al. | |
| 5,356,972 | A | 10/1994 | Sperling et al. | |
| 5,523,337 | A * | 6/1996 | Banerjee et al. | 523/436 |
| 5,523,350 | A | 6/1996 | Venkataswamy et al. | |
| 5,578,297 | A | 11/1996 | Mellul et al. | |
| 5,719,301 | A | 2/1998 | Sleeter | |
| 5,866,628 | A | 2/1999 | Likavec et al. | |
| 6,121,398 | A | 9/2000 | Wool et al. | |
| 6,350,826 | B1 * | 2/2002 | Herold | 525/528 |
| 6,583,218 | B1 | 6/2003 | Airola et al. | |

FOREIGN PATENT DOCUMENTS

| | | | |
|---|---|---|---|
| DE | 3938149 | A1 | 5/1991 |
| EP | 0081973 | A1 | 6/1983 |
| EP | 0336360 | | 10/1989 |
| EP | 0437001 | A1 | 7/1991 |
| FR | 2374419 | | 7/1978 |
| GB | 1248919 | | 10/1971 |
| JP | 48-98883 | | 12/1973 |
| JP | 48-102647 | | 12/1973 |
| JP | 49-103144 | | 9/1974 |
| JP | 50-75649 | | 6/1975 |
| JP | 50-126706 | | 10/1975 |
| JP | 54-070397 | | 6/1979 |
| JP | 56-159222 | | 12/1981 |
| JP | 57-190016 | | 11/1982 |
| JP | 61-133229 | | 6/1986 |

OTHER PUBLICATIONS

Maithani, et al., "Vinyl ester resins and their blends for protective coatings," Paintindia, 56(10), 97 (Oct. 2006).*

La Scala, J.J. et al., "Fatty Acid-Based Monomers as Styrene Replacements for Liquid Molding Resins," Proceedings of the 48th International SAMPE Symposium/Exhibition, Long Beach, CA, May 2003.

Devia, N. et al., "Simultaneous Interpenetrating Networks Based on Castor Oil Elastomers and Polystyrene. 2. Synthesis and Systems Characteristics," Macromolecules, 1979, 360-369, vol. 12, No. 3.

Devia, N. et al., "Simultaneous Interpenetrating Networks Based on Castor Oil Elastomers and Polystyrene. III. Morphology and Glass Transition Behavior," Polymer Eng. Sci., 1979, 869-877, vol. 19, No. 12.

Devia, N. et al., "Simultaneous Interpenetrating Networks Based on Castor Oil Elastomers and Polystyrene. IV. Stress-Strain and Impact Loading Behavior," Polymer Eng. Sci., 1979, 878-882, vol. 19, No. 12.

Guo, A. et al., "Rigid Polyurethane Foams Based on Soybean Oil," J. Appl. Polym. Sci., 2000, 467-473, vol. 77.

Teeter, H.M. et al., "Polymerization of Drying Oils. III. Some Observations on Reaction of Maleic Anhydride With Methyl Oleate and Methyl Linoleate," J. Am. Oil Chem. Soc., 1948, 158-162, vol. 25.

King, G., "The Mechanism of the Oxidation of Oleic and Elaidic Acids and their Methyl Esters by Hydrogen Peroxide in Acetic Acids, Further Observations on the Configurations of the 9:10-Dihydroxystearic Acids," Chemical Society Journal London, 1943, 37-38.

Swern, D. et al. "Hydroxylation of Monounsaturated Fatty Materials with Hydrogen Peroxide," J. Am. Chem. Soc., 1945, 1786-1789, vol. 67.

(Continued)

*Primary Examiner* — Ling Choi
*Assistant Examiner* — Chun-Cheng Wang
(74) *Attorney, Agent, or Firm* — Mendelsohn, Drucker & Associates, P.C.

(57) ABSTRACT

Multi-modal vinyl ester resins having one or more of good fracture toughness, good processing viscosity, and low volatile organic compound emissions are provided. The multi-modal vinyl ester resins are the reaction product of a liquid or crystalline epoxy and an amorphous, solid epoxy, as determined at 25° C., with a vinyl carboxylic acid. The multi-modal vinyl ester resins may contain a reactive diluent, though generally, lower reactive diluent contents are required for such resins than for similar, commercially available vinyl ester resins.

39 Claims, No Drawings

OTHER PUBLICATIONS

Boquillon, N. and Fringant, C., "Polymer Networks Derived From Curing of Epoxidised Linseed Oil: Influence of Different Catalysts and Anhydride Hardeners," Polymer, 2000, 8603-8613, vol. 41.
Li, F. and LaRock, R., "New Soybean Oil-Styrene-Divinylbenzene Thermosetting Copolymers. II. Dynamic Mechanical Properties," J. Poly Sci., Part B: Poly Phys., 2000, 2721-2738, vol. 38.
Rosch, J. and Mulhapt, R., "Polymers from Renewable Resources: Polyester Resins and Blends Based upon Anhydride-cured Epoxidized Soybean Oil," Polymer Bulletin, 1993, 679-685, vol. 31.
Crivello, J.V. et al., "Fabrication and Mechanical Characterization of Glass Fiber Reinforced UV-Cured Composites from Epoxidized Vegetable Oils," J. Appl. Polymer Sci., 1997, 2703-2087, vol. 64, No. 11.
Shogren, R.L., Preparation and Characterization of a Biodegradable Mulch: Paper Coated with Polymerized Vegetable Oils, J. Appl. Polymer Sci., 1999, 2159-2167, vol. 73.
Frischinger, I. and Dirlikov, S., "Toughening of Epoxy Resins by Epoxidized Vegetable Oils," Polymer Comm., 1991, 536-537, vol. 32.
Barrett, L.W. et al., "Naturally Functionalized Triglyceride Oils in Interpenetrating Polymer Networks," J. American Oil Chemists' Society, 1993, 523-534, vol. 70, No. 5.
Tran, N.B. et al., "Castor Oil-Based Polyurethanes: 1. Structural Characterization of Castor Oil—Nature of Intact Glycerides and Distribution of Hydroxyl Groups," Polymer, 1997, 2467-2473, vol. 38, No. 10.
Williams, George I. and Wool, Richard P., "Composites from Natural Fibers and Soy Oil Resins," Applied Composite Materials, 2000, 421-432, vol. 7.
Bunker, Shana P. and Wool, Richard P, "Synthesis and Characterization of Monomers and Polymers for Adhesives from Methyl Oleate," J. Poly. Sci: Part A, Polym. Chem., 2001, 451-458, vol. 40.
La Scala, John and Wool, Richard P., "The Effect of Fatty Acid Composition on the Acrylation Kinetics of Epoxidized Triacylglycerols, " J. of American Oil Chemists' Society, 2002, 59-63, vol. 79, No. 1.
La Scala, John and Wool, Richard P., "The Effect of FA Composition on the Epoxidation Kinetics of TAG," J. of American Oil Chemists' Society, 2002, 373-378, vol. 79, No. 4.
Khot, Shrikant N. et al., "Development and Application of Triglyceride-Based Polymers and Composites," J. of Applied Polymer Science, 2001, 703-723, vol. 82.
La Scala, John J. et al., "Successful Initial Development of Styrene Substitutes and Suppressants for Vinyl Ester Resin Formulations," Army Research Laboratory Technical Report, ARL-TR-3023, 2003.
Kirschenbauer, H.G., "Fats and Oils: An Outline of Their Chemistry and Technology," Reinhold Publishing Corporation, New York, 1960.
Sands, James M. et al., "Greening Future Military Composite Platforms by Controlling Volatile Organic Compound Emissions from Vinyl Ester Resins," SERDP Partners in Environmental Technology, Washington, DC, 2002.
La Scala, John J. et al., "Low Cost and High-Impact Environmental Solutions for Composite Structures," Annual SERDP Report, 2003, 1271.
Wool, Richard P. et al., "Bio-Based Composites," ECCM-11 Rhodes, 2004.
Bunker, Shana et all, "Miniemulsion Polymerization of Acrylated Methyl Oleate for Pressure Sensitive Adhesives," International Journal of Adhesion & Adhesives, 2003, 29-38, vol. 23.
Guo, Andrew et al., "Structure and Properties of Halogenated and Nonhalogenated Soy-Based Polyols," Journal of Polymer Science: Part A: Polymer Chemistry, 2000, 3900-3910, vol. 38.
Guo, Andrew et al., "Polyols and Polyurethanes from Hydroformylation of Soybean Oil," Journal of Polymers and the Environment, 2002, 49-52, vol. 10, Nos. 1/2.
La Scala, John J. et al., "Environmentally Friendly Polymers and Liquid Molding Resins," AIChE, Indianapolis, 2002.
La Scala, John J. et al., "Fatty Acid-Based Monomers as Styrene Replacements for Liquid Molding Resins," Presented at AIChE, FA, 2003.
Chantler, James et al., "Soybean SMC," Composites 2002 Convention and Trade Show, Atlanta, Georgia, Sep. 25-27, 2002.
La Scala, John J. et al., "The Use of Bimodal Blends of Vinyl Ester Monomers to Reduce VOC Emissions," AIChE, Bimodal, 2003.
Youd, Stephen J., "Derakane(™) Epoxy Vinyl Ester Resins—From the First 25 Years, to the 21st Century," Dow Deutschland Inc., 7th University of Witwatersrand Composites Conference: Johannesburg, Rep. S. Africa, Aug. 10, 1994.
Can, E. et al., "Rigid Thermosetting Liquid Molding Resins from Renewable Resources. II. Copolymers of Soybean Oil Monoglyceride Maleates with Neopentyl Glycol and Bisphenol A Maleates," Journal of Applied Polymer Science, 2002, 972-980, vol. 83.
Javni, Ivan and Petrovic, Zoran, "Polymers from Soybean Oil," ANTEC Conference Proceedings of the 1997 55th Annual Technical Conference, ANTEC, Part 1, Apr. 27-May 2, 1997.
Shi, Wenfang et al., "Applications of Rosin—Modified Epoxidized Soya Bean Oil Acrylate in UV Cure Coatings," Journal of Photopolymer Science and Technology, 1992, 453-460, vol. 5, No. 3.
Teeter, H.M. et al., "Reactions of Conjugated Fatty Acids. IV. Diels-Alder Adducts of 9,11-Octadecadienoic Acid," Journal of Organic Chemistry, 1957, 512-514, vol. 22.
Javni, I. et al., "Soybean-Oil-Based Polyisocyanurate Rigid Foams," Journal of Polymers and the Environment, 2004, 123-129, vol. 12, No. 3.
Plimmer, H., "The Reaction of Maleic Anhydride with Non-Conjugated Unsaturated Fatty Materials," Journal of the Oil & Colour Chemists' Association, 1949, 99-112, vol. 32, No. 345.
Bickford, W.G. et al., "Autoxidation of Fats. II. Preparation and Oxidation of Methyl Oleate-Maleic Anhydride Adduct," Journal of the American oil Chemists' Society, 1948, 254-257, vol. 25.
Isii, Y., "Peroxide Oxidation of Triglycerides to Make Epoxidized Triglycerides," J. Soc. Chem. Industry, Japan, 1940, 255, 315, 374, vol. 43.
European Office Action, EP 05804814.1-2109 (Oct. 13, 2010).
Maithani et al , "Vinyl ester resins and their blends for Protective coatings", Paintindia, 56(10), 97 (Oct. 2006).*

* cited by examiner

MULTI-MODAL VINYL ESTER RESINS

Matter enclosed in heavy brackets [ ] appears in the original patent but forms no part of this reissue specification; matter printed in italics indicates the additions made by reissue.

STATEMENT OF GOVERNMENT INTEREST

This invention was reduced to practice with Government support under Grant No. DAAD19-02-2-0010 awarded by the Army Research Laboratory; the Government is therefore entitled to certain rights to this invention.

BACKGROUND OF THE INVENTION

1. Field of the Invention

The present invention relates to the preparation of vinyl ester resins with low volatile organic compound (VOC) content to reduce hazardous air pollutant (HAP) emissions. More specifically, the present invention relates to multi-modal vinyl ester resins.

2. Brief Description of the Prior Art

Styrene is the most common reactive diluent used in thermosetting liquid molding resins. Recently, the Federal Environmental Protection Agency of the United States of America introduced legislation to address hazardous emissions from composite manufacturing and repair by enacting new emission standards through the "National Emission Standards for Hazardous Air Pollutants: Reinforced Plastic Composites Production," which specifically targets styrene, methyl methacrylate, and mclhylene chloride as regulated hazardous air pollutants. Volatile organic compound emissions are liberated during all of the phases of composite fabrication. Styrene emissions occur during the mixing of diluents, catalysts, and initiators into the system. Composite parts typically have very large surface to volume ratios, which allows up to 20% of the styrene content to be lost during the molding stage. During cure, elevated temperatures increase the vapor pressure of styrene and thus increase the rate of VOC emissions. Unfortunately, even after cure during the lifetime of the part, styrene emissions can be substantial. Past work has shown that up to 50% of the styrene is unreacted after cure. Therefore, liberation of VOC emissions must be mitigated not only during composite processing, but also during curing and fielding of the composite part.

Simply reducing the styrene content in VE resins causes two problems. First of all, the resin viscosity increases unacceptably. The second problem is that the fracture toughness of these resins decreases as the styrene content is reduced. Lower molecular weight vinyl ester monomers can be used to reduce the resin viscosity, but detrimentally affects the fracture properties. This is the problem with Dow Derakane™ 441-400, which uses low molecular weight vinyl ester monomers and only 33 wt % styrene. The viscosity is approximately 400 cP, which is acceptable for liquid molding operations. On the other hand, the fracture toughness is only ~100 $J/m^2$.

Reactive diluents other than styrene have been used to reduce both VOC and HAP emissions. 2-hydroxymethacrylate has been used, but the resin viscosity and properties of the resulting polymers are inferior to that of styrene-based thermosetting resins. In addition, 2-hydroxymethacrylate produces significant VOC emissions. Ortho and para-methyl styrene have lower volatilities than styrene; however, these chemicals still produce significant VOCs and would probably be classified as HAPs if used on a large scale.

Additives, such as paraffin waxes, have been used to suppress styrene emissions. Yet, these resins suffer from poor polymer performance and poor interfacial adhesion in fiber-matrix composites. Furthermore, studies have shown that these additives do not effectively decrease styrene emissions during the time-scale of use.

Vinyl esters are used in military and commercial applications because of their high performance, low weight, and low cost. Although it is important to reduce the styrene content in these resins, the fracture toughness of VE resins must be improved for military, automotive, and other applications. Many methods have been used to toughen these resins, but with little success.

A simple way to improve impact performance of thermosets is through matrix toughening, or decreasing the crosslink density of the network. Previous work shows that this method works for vinyl esters. Synthesizing vinyl ester monomers with a higher molecular weight decreases the crosslink density and gives the network more molecular flexibility. A more flexible network corresponds to a tougher system; however, direct losses are experienced in other mechanical and thermal properties such as modulus and glass transition temperature ($T_g$). In addition, increasing vinyl ester molecular weight also increases resin viscosity. This viscosity increase could prohibit the use of inexpensive liquid molding techniques for composite fabrication.

To avoid significant plasticization of the matrix, other methods for toughening can be found in the literature and have been used commercially. Second phase toughening with rubber modifiers that precipitate from solution is one such method. It has heen shown that thermosetting systems, such as epoxies, can be toughened through rubber modification. For example, phase separation of a carboxyl-terminated rubber (CTBN) from a reacting mixture of diglycidyl ethers of bisphenol-A (DGEBA) and diamines (e.g. diamino diphenyl sulfone) results in a well-dispersed phase of rubber particles having typical dimensions of 1 μm and a material with improved toughness. For higher molecular weight DGEBA systems, the increase in fracture toughness is dramatic, reaching up to one order of magnitude. The rubber modifier must be miscible with the resin at room temperature and should fully precipitate from solution during cure to avoid plasticizing the epoxy phase.

Because rubber modification of epoxies has been successful, it should follow that toughening vinyl esters would experience the same type of success. Dreerman and coworkers attempted to toughen vinyl ester using an epoxy terminated (ETBN) and vinyl terminated (VTBN) butadiene-acrylonitrile rubber. They found that ETBN yielded the highest degree of toughening with approximately 70% increase in $K_{Ic}$. This pales in comparison to toughened epoxies, which exhibit over an order of magnitude increase in $G_{IC}$ from unmodified epoxies. Also the rubber modifiers were not compatible with the vinyl ester, which is a necessary condition for rubber toughening. Attempts to improve the compatibility (increased temperature, ultrasonic treatment, and surfactants) were not successful. Ullet reported similar trends when toughening vinyl ester. Two-phase mixtures were reported for butadiene-acrylonitrile based rubber modifiers. Compatibilizing agents improved the solubility of the rubber, but hindered the phase separation during cure. Also, a relatively low increase to $K_{Ic}$ (116%) was achieved. Siebert and coworkers were able to obtain higher levels of toughness, as high as a 540% increase in $K_{IC}$. Unfortunately, this toughening required relatively high rubber levels and resulted in a significant plasticization of the vinyl ester matrix. Similar problems with toughening vinyl esters were experienced by other research groups as well.

Bimodal blends of unsaturated polyester monomers have been used to make resins with good fracture properties and reduced resin viscosities. However, the viscosities of these resins were significantly higher than what is acceptable for inexpensive liquid molding of composite structures. Blends of VE monomers have also been used to make polymers. Dow Derakane resins typically contain mixtures of VE monomers with molecular weights as low as 540 g/mol and as high as 1900 g/mol. Because the molecular weights of the components are fairly similar, only modest increases in fracture toughness are observed ($G_{IC}$~250 J/m$^2$). On the other hand, the VE multi-modal blends detailed herein have $G_{IC}$ values greater than 200 J/m$^2$ at low styrene contents (~30 wt %.). Therefore, multi-modal blends allow for the production of polymers with high fracture toughness, low viscosity, and low VOC emissions.

SUMMARY OF THE INVENTION

In a first aspect, this invention relates to the preparation of multi-modal vinyl ester resins with low volatile organic compound (VOC) content, low resin viscosity, and high fracture toughness. These vinyl ester resins contain a mixture of low and high molecular weight vinyl ester monomers (i.e. bimodal blend) for use as liquid molding resins for inexpensive composite fabrication processes, such as vacuum assisted resin transfer molding (VARTM), wet lay-up, pultrusion, and filament winding. The low molecular weight vinyl ester monomers keep the viscosity of the resin low, while the high molecular weight monomers improve the fracture toughness of the polymer. As a result, these resins have improved fracture toughness relative to commercial resins, while having similar resin viscosity. Furthermore, low reactive diluent (e.g. styrene) contents can be used resulting in low VOC emissions, while still maintaining acceptable resin viscosity and good tincture toughness.

In a second aspect, the present invention relates to a method for the preparation of low VOC multi-modal vinyl ester resins. The method includes the step of reacting at least one low molecular weight vinyl ester that is a liquid or crystalline epoxy resin at 25° C. and at least one high molecular weight vinyl ester that is an amorphous, solid epoxy resin at 25° C. at a temperature and for a time sufficient to form the multi-modal blend of vinyl ester monomers.

DETAILED DESCRIPTION OF THE PREFERRED EMBODIMENTS

In a first aspect, the present invention relates to the preparation of multi-modal vinyl ester polymers. The invention is applicable to all acrylic and alkyl-acrylic vinyl esters.

Vinyl esters suitable for use in the invention include, but are not limited to, methacrylated and acrylated glycidyl ethers of bisphenols. Typically, any epoxy resin or combination of epoxy resins can be employed. Suitable epoxy resins include *epoxy resins derived from monomers including*, but [are] not limited to, bisphenol A, hexafluorobisphenol A, bisphenol E, bisphenol F, tetramethyl bisphenol E, tetramethyl bisphenol F, bisphenol M, bisphenol C, bisphenol P and bisphenol Z. [Methacrylates] *Monomers such as methacrylates* and acrylates of ethoxylated bisphenols may also be employed.

Vinyl esters having vinyl functionality greater than two may also be employed. This includes systems such as: acrylic and alkyl-acrylic vinyl esters of epoxy novolacs, acrylates *of* tris-hydroxyphenylmethane glycidyl ether (THPM-GE), ethoxy phenol novolacs, and *an epoxy resin derived from* ethoxylated tris-hydroxyphenylmethane. Also, brominated versions of the above systems, such as, for example, brominated bisphenol A based vinyl esters, may be employed. Prefened vinyl esters are the bisphenol vinyl esters due to the desirability of making structural composites fiom the resultant polymers.

Vinyl ester monomers were prepared via reaction of a vinyl carboxylic acid with an epoxy resin, as shown below for the methacrylation of diglycidyl ether of bisphenol (DGEBA).

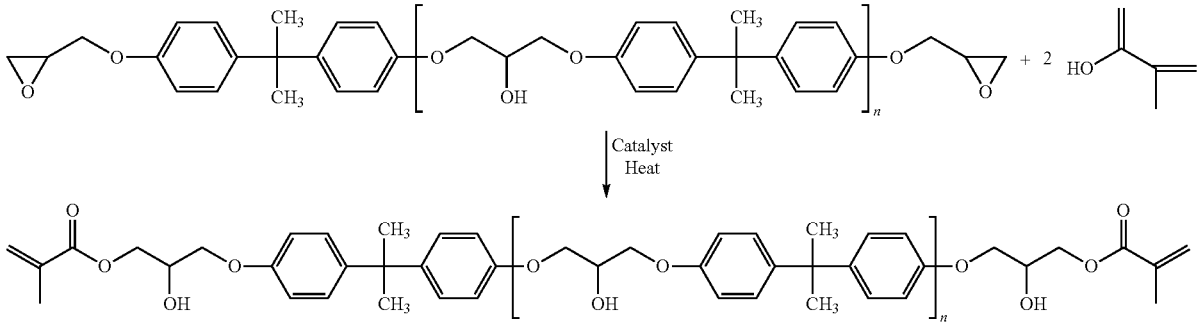

The vinyl ester multi-modal blends were produced using a mixture of a low molecular weight epoxy resin, such as Epon 828™, and a high molecular weight resin, such as Epon 1009F™. High molecular weight Epon™ resins are quite inexpensive. Therefore, the vinyl ester multi-modal blends not only offer performance advantages, but also offer cost savings.

Any vinyl carboxylic acid or blend of acids can be used to form a vinyl ester via reaction with epoxy. Common acids include acrylic acid and methacrylic acid. Any catalyst cane be used that promotes the acid-epoxy reaction, while maintaining or reducing the rate of epoxy homopolymerization. A homogeneous catalyst can be used in concentrations of as low as 0.01 wt % and as high as 3 wt %. Heterogenous catalysts can be used in any concentration.

The vinyl ester bimodal blends described in this patent disclosure have sufficiently low viscosities, because of the low molecular weight vinyl ester monomer, while having high fracture toughness because of the high molecular weight vinyl ester monomer. As a result, very large increases in fracture toughness ($G_{IC}$~500 J/m$^2$) were achieved, while still maintaining low resin viscosity.

The preparation of these multi-modal blends with defined molecular weight distributions was accomplished by dissolving the high molecular weight Epoxy resin in the low molecular weight epoxy resin and low contents of styrene (~20 wt %). Small amount of hydroquinone were added to inhibit polymerization during reaction.

These vinyl ester multi-modal blends were designed to improve the fracture toughness of vinyl ester polymers, as well as to lower VOC emissions, while maintaining low resin viscosity and low cost. Commercial vinyl ester resins are inexpensive but also have relatively low fracture toughness. In addition, commercial resin systems produce high styrene emissions during all the stages of composite fabrication and usage due to the use of significant proportions of styrene as a reactive diluent in such resins. Multi-modal vinyl resins have fracture properties that are superior to that of commercial resins. In addition, multi-modal vinyl resins require lower styrene contents than commercial resins to obtain good polymer performance. Furthermore, because multi-modal vinyl blends utilize inexpensive high molecular weight epoxy monomers, these resins are expected to be more affordable than commercially available vinyl ester resins.

The monomers described herein may be used to produce resins and polymers with superior properties relative to commercial thermosetting liquid molding resins. Therefore, these vinyl ester multi-modal blends can be used for the production of polymer matrix composites, which are used in military, automotive, recreational, and marine applications. Specific items made from these materials include body panels and armor for vehicles, composite hoods, and boat hull structures. In addition, these materials can be used with traditional thermosetting vinyl and polyester resins to serve as gel coating matter providing a protective coating.

In general, references to low molecular weight monomers in the context of vinyl ester monomers, refers to vinyl ester monomers that are derived from liquid or crystalline epoxy resins at 25° C. High molecular weight vinyl ester monomers refer to vinyl ester monomers derived from amorphous, solid epoxy resins at 25° C. In the context of the present application, Epon 828™ is the low molecular weight vinyl ester monomer and the other Epon™ monomers are high molecular weight monomers.

Typically, in bimodal vinyl ester blends, the low molecular weight monomer comprises 5-65% by weight of the overall resin weight, the high molecular weight monomer comprises 5-65% by weight of the overall resin weight, and the reactive diluent, including styrene, ortho-methylstyrene, para-methylstyrene, 2-hydroxymethacrylate, methyl methacrylate, ethyl methacrylate, butyl methacrylate, methyl acrylate, cyclohexyl methacrylate, isobomyl methacrylate, and fatty acid monomers, comprises up to 60% by weight of the overall resin weight. In general, the low molecular weight monomers can comprise 1-99% by weight of the overall resin, the high molecular weight monomer comprises 1-99% by weight of the overall resin weight, and the reactive diluent comprises up to 98% by weight of the overall resin weight. More preferably, to reduce VOC, it is desirable to employ no more than 40% by weight of the reactive diluent, and even more preferably no more than 30% by weight of the reactive diluent, and most preferably no more than 20% by weight of the reactive diluent, based on the overall resin weight. The reactive diluent component can also be partially replaced by one or more fatty acid monomers described below.

There are at least four potential advantages of various aspects of the present invention. These advantages are:

The use of inexpensive high molecular weight epoxy resins as components of vinyl ester resin.

The preparation of multi-modal blends of vinyl ester monomers with customized molecular weight distributions.

The concept of using mixtures of low and high molecular weight vinyl ester monomers to maintain low resin viscosity, while improving polymer fracture toughness.

The concept of using vinyl ester multi-modal blends to reduce VOC emissions from thermo setting resins while maintaining good rheological and mechanical properties.

The multi-modal resins of the present invention have been tested experimentally and found to be successful, i.e. thermosetting liquid molding resins using vinyl ester multi-modal blends have acceptable resin viscosities and thermo-mechanical properties similar to that of commercial vinyl ester/styrene polymers, and fracture toughness greater than that of commercial resins. The vinyl ester resins of the invention may have a glass transition temperature from about 60° C. to about 200° C.

These resins can be cured in any way used to cure free-radically reactive systems, including, but not limited to thermal cure, room temperature cure, electron beam cure, and ultraviolet cure.

The present invention also relates to the process for making the multi-modal resins of the invention. The method includes the step of reacting at least one low molecular weight vinyl ester that is a liquid or crystalline epoxy resin at 25° C. and at least one high molecular weight vinyl ester that is an amorphous, solid epoxy resin at 25° C. at a temperature and for a time sufficient to form the multi-modal blend of vinyl ester monomers. The resulting resin may have a viscosity of from about 30 cP to about 2000 cP at 25° C., and optionally, the resin may have a viscosity of from about 30 cP to about 500 cP at 25° C.

All of the various aspects of the invention can be employed in vinyl esters using any conventional reactive diluent. Generally, any low viscosity monomer with a single, free-radically polymerizable group can be employed as a reactive diluent. Exemplary reactive diluents include, but are not limited to, styrene, ortho-methylstyrene, para-methylstyrene, 2-hydroxymethacrylate, methyl methacrylate, ethyl methacrylate, butyl methacrylate, methyl acrylate, cyclohexyl methacrylate, and isobornyl methacrylate. All of the various aspects of the invention may also employ a free-radical inhibitor, such as hydroquinone, to reduce or prevent gelation of the reaction mixture.

Alternatively, the reactive diluents may include one or more monomers derived from fatty acids. Such fatty acid monomers include current and future commercial fatty acid monomers such as lauryl methacrylate. In addition, these monomers may include fatty acid monomers represented by the following formulae:

1b

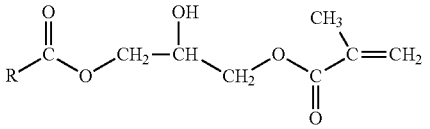

-continued

3a

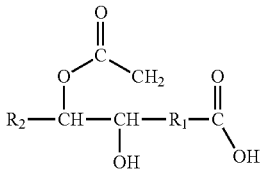

3b

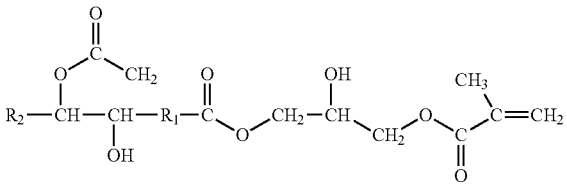

4a

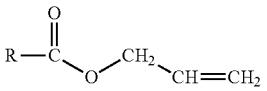

4b

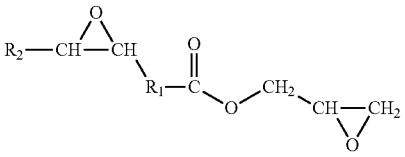

4c

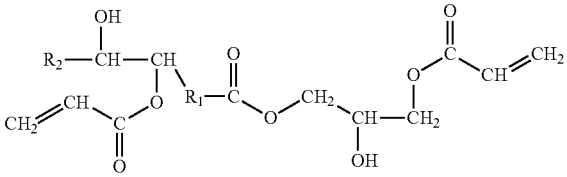

6b, 8a

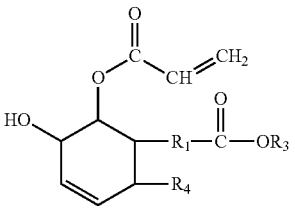

7b

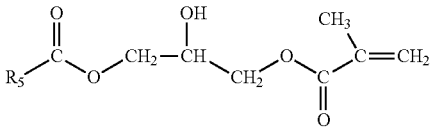

8b

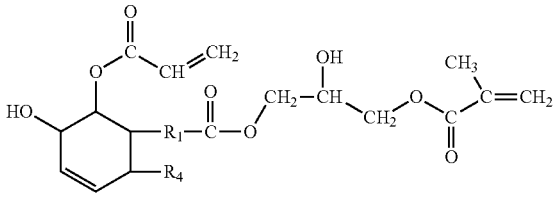

R, $R_2$, and $R_4$ are any fatty acid residue, specifically including any $C_2$-$C_{30}$ residue, including saturated alkyl residue, unsaturated alkyl residue; acetylenic alkyl residue, hydroxy alkyl residue, carboxylic acid alkyl residue, divinyl ether alkyl residue, sulfur-containing alkyl residue, amide alkyl residue, methoxy alkyl residue, keto alkyl residue, halogenated alkyl residue, branched methoxy alkyl residue, branched hydroxyl alkyl residue, epoxy alkyl residue, and fatty acyl-CoA alkyl residue, ring-containing alkyl residue, including cyclopropane alkyl residues, cyclopentenyl alkyl residues, cyclohexyl alkyl residues, furanoid alkyl residues, phenylalkanoic alkyl residues, and lipoic alkyl residues.

$R_1$ is any fatty acid segment, specifically including any saturated alkylene segment, unsaturated alkylene segment; acetylenic alkylene segment, hydroxy alkylene segment, divinyl ether alkylene segment, sulfur-containing alkylene segment, amide alkylene segment, methoxy alkylene segment, keto alkylene segment, halogenated alkylene segment, branched methoxy alkylene segment, branched hydroxyl alkylene segment, epoxy alkylene segment, and fatty acyl-CoA alkylene segment, ring-containing alkylene segment, including cyclopropane alkylene segments, cyclopentenyl alkylene segments, cyclohexyl alkylene segments, furanoid alkylene segments, phenylalkanoic alkyl segments, and lipoic alkylene segments of backbone lengths from 1-25 atoms. $R_3$ is selected from the group consisting of H and an alkyl residue having 1-10 carbon atoms. $R_5$ is an unsaturated cyclic alkyl residue having 10-50 carbon atoms and with $R_1$ and $R_4$ functionality.

A number of synthetic procedures can be employed for making fatty acid-based monomers to be used as a reactive diluent in vinyl ester resins. FIG. 1 lists some of the synthetic routes that can be employed. In all of the synthetic routes, the starting materials are selected from triglycerides (Known 0), fatty acids (Known 1a), fatty acid methyl esters (Known 2a), and cyclic fatty acids (Known 5a). Refined plant oils contain approximately 99% triglyceride molecules. Industrially, fatty acids (FA) are produced from triglycerides by reaction with a strong acid, such as HCl. Fatty acid methyl esters (FAME) are produced by a methanolysis reaction. In this reaction, methanol replaces the glycerol ester linkages of the fatty acids under basic conditions. Cyclized fatty acids may be produced by reacting polyunsaturated fatty acids of triglycerides at high temperatures under basic conditions.

In synthetic Route 1b, fatty acids are reacted with an epoxy-vinyl species, such as glycidyl methacrylate. The carboxylic acid group of each of the fatty acids adds to the epoxide group on glycidyl methacrylate. The resulting species of glycidyl methacrylate fatty acid may be a fairly long hydrocarbon (typically 12-26 atoms in length depending on the fatty acid used) with a terminal unsaturation site that is capable of free radical polymerization (Product 1b). The length of the fatty acid chain affects the resin and polymer properties. Therefore, the particular fatty acid used has an effect on the polymer properties, thereby allowing customization of the polymer by selection of the fatty acid monomer (s).

Any fatty acid can be methacrylated using glycidyl methacrylate. For example, butyric acid, capric acid, caprylic acid, lauric acid, myristic acid, palmitic acid, stearic acid, oleic acid, and linoleic acid were all used as starting materials for such methracrylation reactions. Mixtures of the fatty acids found in safflower oil were also used for methacrylation reactions.

Epoxides, such as glycidyl methacrylate, react with fatty acids at temperatures below 100° C. with short reaction times, if properly catalyzed. A chromium based catalyst, AMC-2™ (Aerojet Chemicals, Rancho Cordova, Calif.) has been successfully used to catalyze this reaction in amounts ranging from 0.1-3.0 wt %, based on the total weight of the reaction mixture.

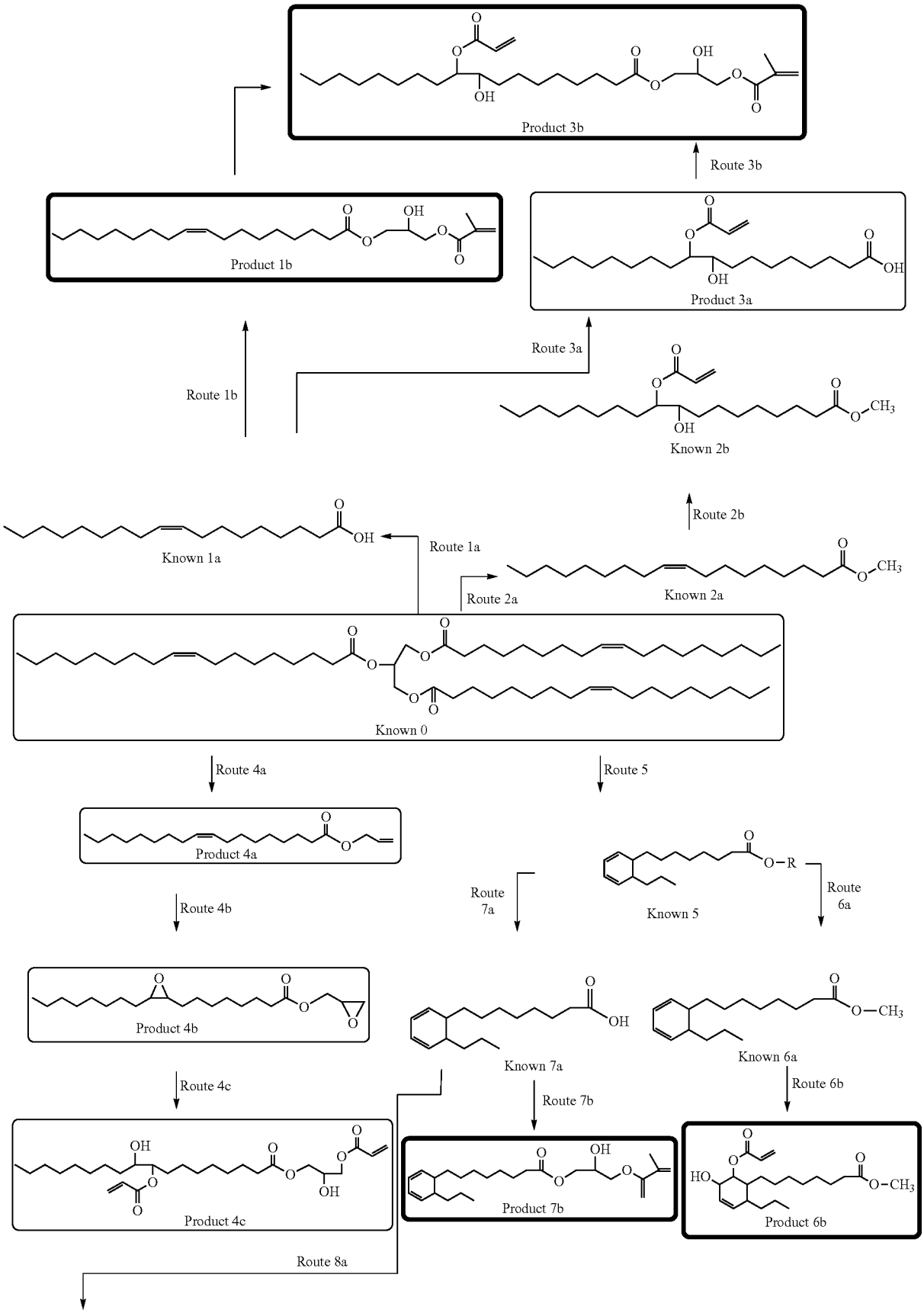
Product 3b
Route 3b
Product 1b
Product 3a
Route 3a
Route 1b
Known 2b
Route 2b
Known 1a
Route 1a
Known 2a
Route 2a
Known 0
Route 4a
Route 5
Product 4a
Route 4b
Route 7a
Known 5
Route 6a
Product 4b
Known 7a
Known 6a
Route 4c
Route 7b
Route 6b
Product 4c
Product 7b
Product 6b
Route 8a -continued

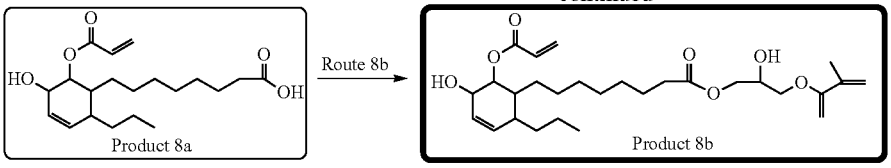

FIG. 1: The proposed synthetic routes to produce fatty acid-based monomers.

Alternatively, 0.1-3.0 wt % of a 3:1 ratio of triphenyl antimony ($SbPh_3$) to triphenyl phosphine ($PPh_3$) catalyst can be used to catalyze the reaction of epoxides with fatty acids. Near IR or mid IR (FTIR) can be used to determine the extent of the reaction since the primary epoxide peaks at 4530 $cm^{-1}$ and 917 $cm^{-1}$ can be tracked during the reaction. When the reaction has gone to completion, the epoxide peaks disappear, indicating substantially complete consumption of the epoxide during the reaction.

In synthesis Route 2b, unsaturation sites on fatty acid methyl esters are first epoxidized, and then reacted with a vinyl carboxylic acid, such as acrylic acid or methacrylic acid. The resulting monomer (Known 2b) includes an acrylate or methacrylate group, which is capable of free radically polymerizing, in the middle of a long hydrocarbon chain (20 atoms long). Ideally, this monomer will have only a single acrylate group. For this to be the case, monounsaturated fatty acids need to be used. Pure mono-unsaturated acids are fairly expensive. Canola oil and olive oil are relatively inexpensive sources of mono-unsaturated acids, but they each have significant contents of saturated and polyunsaturated acids. The preparation ofacrylated epoxidized fatty acid methyl esters is described elsewhere.

Di-functional monomers can be used to improve the properties of vinyl ester resins by providing additional cross-linking as well as decreasing the amount of unreacted monomer in the cured polymer. Synthesis Route 3 shows a way to produce di-functional monomers (Product 3b) by combining the synthetic procedures of synthesis Routes 1 and 2. Free-radically reactive fatty acids (Product 3a) are an intermediate, which are believed to be novel. These species can be used to create free-radically reactive surfactants by simple addition of the free-radically reactive fatty acid with aqueous sodium bicarbonate.

Allyl alcohol (AOH) is used to break up the triglycerides into allyl fatty acid monomers (synthesis Route 4a, Product 4a) in a procedure that is very similar to the methanolysis reaction. These monomers (AOH-FA) have a primary unsaturation site that could potentially be used for free radical polymerization. In addition, the unsaturation site can be epoxidized to form fatty acids with both primary and secondary epoxide groups (synthesis Route 4b, Product 4b). This product can be used as an epoxy chemical for various applications, such as a chain extender in epoxy resins. In addition, the epoxide groups can be reacted with a vinyl acid, such as acrylic acid, to yield fatty acids with free-radical functionality at both the center and end of the fatty acid chains (Product 4c).

Allyl alcohol was used to break apart the glycerol linkage of triglycerides in soybean oil to produce allyl alcohol modified fatty acids (AOH-FA) (Product 4a). The reaction mixture contained 70 g oil (soybean oil), 22 ml allyl alcohol, and 25.5 ml of a 0.5 N KOH/allyl alcohol solution. The contents were mixed and reacted at 60° C. for 3 days. Afterwards, the reaction products were recovered using an ether extraction, as for the methanolysis reaction. The level of functionalization with allyl alcohol was measured using $^1$H-NMR. Results have shown that the allyl alcoholysis reaction proceeds to about 80% completion. Other plant oils, including olive oil and canola, were modified in the same manner with the same results. Therefore, this method can be applied to all triglyceride oils. Epoxidation of the allyl unsaturation sites can be done using peroxyacetic acid or transition metal complexes, as described elsewhere.

The fatty acids employed to make the fatty acid monomers of the invention can be obtained from any suitable source of triglycerides. Suitable renewable plant sources of fatty acids include, but are not limited to, almond seed oil, arachis (groundnut) oil, canola oil, castor oil, catnip oil, cedarwood oil, citronella oil, coprah oil, corn oil, cottonseed oil, garlic oil, jojoba oil, linseed oil, neem oil, olive oil, palm oil, palm kernal oil, peanut oil, perilla oil, rapeseed oil, rice bran oil, safflower oil, sesame oil, soja oil, soybean oil, sunflower oil, tall oil, tung oil, butter, lard, tallow, vernonia, yellow grease, camelina, carthame, grape seed, hazelnut, poppy seed oil, walnut oil, avocado pear, black-currant, borage, cacao, evening primrose, kukui oil and wheat germ oil.

Exemplary classes of fatty acids that may be employed to make the fatty acid monomers of the present invention include, but are not limited to, straight chain fatty acids, branched chain fatty acids, and ring containing fatty acids. Straight chain fatty acids include saturated fatty acids, monoenoic fatty acids, polyenoic fatty acids, acetylenic fatty acids, hydroxy fatty acids, dicarboxylic fatty acids, divinyl ether fatty acids, sulfur-containing fatty acids, fatty acid amides, methoxy fatty acids, keto fatty acids, and halogenated fatty acids. Branched chain fatty acids include branched alkyl fatty acids, branched methoxy fatty acids and branched hydroxy fatty acids (mycolic acids). Ring-containing fatty acids include cyclopropane fatty acids, cyclopentenyl fatty acids, furanoid fatty acids, cyclohexyl fatty acids, phenylalkanoic fatty acids, epoxy fatty acids and lipoic fatty acids.

Exemplary fatty acids that may be employed to make the fatty acid monomers of the present invention, include, but are not limited to, butyric acid, capric acid, caprylic acid, lauric acid, myristic acid, palmitic acid, stearic acid, oleic acid and linoleic acid.

EXAMPLES OF FATTY ACID MONOMER SYNTHESIS

Example 1

The reaction between a stoichiometric amount of oleic acid (OA) and glycidyl methacrylate (GM) was catalyzed with 2 wt % AMC-2™ catalyst and run at room temperature. The reaction went to ~90% completion after 3 days of reaction.

Example 2-4

The reaction between a stoichiometric amount of oleic acid and glycidyl methacrylale was catalyzed with 0.5 wt %, 1 wt %, and 2 wt % AMC-2™ catalyst and run at 70° C. The reaction went to completion in 1.5 hrs when 2 wt % catalyst was used. The reaction went to completion after 2.5 hours when 1 wt % catalyst was used. When 0.5 wt % catalyst was used, the reaction took longer than 4 hours.

Examples 5-7

The effect of higher reaction temperatures on the reaction of oleic acid and glycidyl methacrylate was studied using 1 wt % AMC-2™ catalyst. Reaction temperatures of 80° C., 90° C., and 100° C. were used. It was found that increasing temperature decreased the reaction time necessary to reach complete reaction of the epoxides. However, at 100° C., HPLC results show the formation of some higher molecular weight species. This indicates that undesirable epoxy homopolymerization (etherification) occurred to some extent at 100° C.

Example 8

The $SbPh_3/PPh_3$ catalyst also effectively catalyzed the acid-epoxy reaction between fatty acids and glycidyl methacrylate. For the reaction of glycidyl methacrylate with oleic acid using 1 wt % of this catalyst mixture, the reaction went to completion after 5 hours of reaction at 70° C.

In order to simultaneously minimize the catalyst concentration and reaction time, 0.1-3.0 wt % of a suitable catalyst such as AMC-2™ may be employed, whereas use of 1 wt % AMC-2™ was found to be optimum for the reaction of glycidyl methacrylate and oleic acid. Reaction temperatures ranging from 60-90° C. were found to maximize the extent of reaction while minimizing the extent of side reactions.

Examples 9-14

Glycidyl methacrylate was reacted with stoichiometric amounts of lauric acid, stearic acid, oleic acid, linoleic acid, linolenic acid, and a mixture of the fatty acids of safflower oil using 1 wt % AMC-2™ at reaction temperatures ranging from 60-90° C. The conversion of the reactants to the desired product was nearly complete (>95%). HPLC results showed that no higher molecular weight species were formed. In addition, $^1$H-NMR confirmed the structure and functionality of these methacrylated fatty acids. This demonstrates to a skilled person that any fatty acid can be successfully modified in this manner to produce a fatty acid monomer.

Example 15

Synthetic Routes 6-8 make use of the cyclized derivatives of triglycerides. In synthetic Route 6, a methyl ester of the cyclized species is formed via methanolysis (Known 6a). The remaining unsaturation sites on the fatty acid are then epoxidized and acrylated to add free radical functionality to the fatty acid (Product 6b). In Route 7, cyclized fatty acids are produced by acidolysis of cyclized triglycerides or cyclized fatty acid esters (Known 7a). This species is then reacted with glycidyl methacrylate, in the same manner as Route 1, to attach vinyl functionality to the end of the cyclized fatty acid. Route 8 is just a combination of Routes 6 and 7, resulting in di-vinyl, cyclized fatty acid monomers (Product 8b).

Example 16

Vinyl ester was prepared via methacrylation of Epon 828™. 525.7 g Epon 828™ resin was reacted with 243.5 g methacrylaic acid. AMC-2 was used as a catalyst for the reaction and to prevent epoxy homopolymerization in the amount of 7.6 g (equivalent to 1 wt %). The reaction was run at about 90° C., but water was periodically flowed through cooling coils within the reactor to keep the temperature below 95° C. After 1 hr and 47 minutes, the acid number of a sample of the reaction contents was found to be 8, and FTIR indicated that there was no peak at 910 $cm^{-1}$, indicating that all of the epoxy reacted. NMR results showed that there were two methacrylate groups per molecule of Epon 828™ resin. GPC results indicated a large single vinyl ester peak at 14.45 min and a small peak at 18.5 minutes rept esenting catalyst, impurities, and unreacted methacrylic acid. The product was a viscous green liquid.

Example 17

Acrylated epoxy (VEA) was prepared via acrylation of Epon 828™. 401.1 g Epon 828™ resin was reacted with 160.0 g acrylic acid. AMC-2 was used as a catalyst for the reaction and to prevent epoxy homopolymerization in the amount of 5.6 g. The reaction was run at about 90° C., but water was periodically flowed through cooling coils within the reactor to keep the temperature below 95° C. After 1 hr and 20 minutes, the acid number of a sample of the reaction contents was found to be 2.6, and FTIR indicated that there was no peak at 910 $cm^{-1}$, indicating that all of the epoxy reacted. NMR results showed that there were two acrylate groups per molecule of Epon 828™ resin. The product was a viscous green liquid.

Example 18

Methacrylated lauric acid was prepared by reacting 5897 g lauric acid with 4166 g glycidyl methacrylate in the presence of 51 g AMC-2 catalyst. The reaction was run in a 20 L vessel while stirring vigorously with a mechanical stirrer. The reaction was run at 50° C. for 16 hrs. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycicyl methacrylate. NMR showed than no epoxies remained, while 0.98 methacrylate groups were present per fatty acid segment. The viscosity was 48 cP at 30° C. using a Brookfield Viscometer.

Example 19

Methacrylated oleic acid was prepared by reacting 108.1 g oleic acid with 54.4 g glycidyl methacrylate in the presence of 1.6 g AMC-2 catalyst. The reaction was run at 55° C. for 3.5 hrs and then for 2.5 hrs at 70° C. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycicyl methacrylate. NMR showed than no epoxies remained, while 0.98 methacrylate groups were present per fatty acid segment. The viscosity was 60 cP at 30° C. using a Brookfield Viscometer.

Example 20

10 g methacrylate oleic acid was placed in a 20 mL vial, with the lid screwed on tightly. The sample was allowed to sit for 2.5 years at room temperature in a dark cabinet. During this time, gelation did not occur.

Example 21

Methyl oleate in the amount of 63.1 g was epoxidized in the presence of 64.35 g hydrogen peroxide (30% aqueous) and 20.7 g formic acid. The reaction was allowed to run for 16 hrs while mechanically mixing. The epoxidized oil was ether extracted. The ether was evaporated under vacuum at 40° C. NMR results show that the extent of epoxidation was 0.94 epoxies per fatty acid methyl ester. The product was a white solid-liquid mixture.

Example 22

62.43 g of the epoxidized methyl oleate in Example 21 were reacted with 19.74 g acrylic acid at 85° C. for 6 hrs. AMC-2 catalyst and hydroquinone were used in the amounts of 1.25 g and 0.199 g, respectively. The product was ether extracted to remove hydroquinone and unreacted acrylic acid. The ether was evaporated at 40° C. under vacuum. NMR results showed the extent of acrylation was 0.90 based on the initial level of unsaturation (i.e., 0.9 acrylates per molecule). The viscosity was 56 cP at 30° C. using a Brookfield Viscometer. The product was a brown-green liquid.

Example 23

10.0 g of the product from Example 19 was epoxidized using 10.5 g hydrogen peroxide (30% aqueous) and 3.2 g formic acid, along with 0.01 g hydroquinone to reduce the likelihood ofpolymerization. The reaction was allowed to run for 16 hrs while mechanically mixing. The epoxidized oil was ether extracted. The ether was evaporated under vacuum at 40° C. NMR results show that the extent of epoxidation was 0.8 epoxies per fatty acid. 9.0 g of the epoxidized product was reacted with 1.44 g acrylic acid with 0.21 g AMC-2 and 3 mg hydroquinone for 4 hours. The product was ether extracted, and the ether was evaporated under vacuum at 40° C. The product contained 0.25 acrylates and 0.95 methacryltes per triglyceride. The resulting monomer was a brown-green viscous liquid.

Example 24

Alcoholoysis of soybean oil was run using allyl alcohol. 60.0 g of soybean oil was reacted with 22.1 mL allyl alcohol plus 18.3 mL 0.5 N potassium hydroxide in allyl alcohol. The reaction was run at 62° C. for 4 days. The products were separated using an ether extraction. The ether was evaporated at 40° C. under vacuum. NMR showed that the final product had 0.82 allyl groups per fatty acid. The viscosity was 10 cP at 30° C. using a Brookfield Viscometer. The final monomer was a yellow low viscosity liquid.

Example 25

2.0 g linseed oil were reacted with a mixture of 8.2 g ethylene glycol and 2.0 g potassium hydroxide at 240° C. for 3 days. The final product was ether extracted and the ether was evaporated under vacuum at 40° C. NMR showed that there were 2.05 unsaturation sites per fatty acid and an extent of cyclization of 4%. The product was an orange-brown liquid.

Example 26

Other catalysts were used to prepare the vinyl ester resins. Vinyl ester was prepared via methacrylation of Epon 828™. 528.5 g Epon 828™ resin was reacted with 249.6 g methacrylic acid. 1 wt % of a 3:1 ratio of triphenyl antimony ($SbPh_3$) to triphenyl phosphine ($PPh_3$) was used as a catalyst for the reaction and to prevent epoxy homopolymerization in the amount of 7.75 g. The reaction was run at about 90° C., but water was periodically flowed through cooling coils within the reactor to keep the temperature below 95° C. After 4 hr and 45 minutes, the acid number of a sample of the reaction contents was found to be 4, and FTIR indicated that there was no peak at 910 $cm^{-1}$, indicating that all of the epoxy reacted. NMR results showed that there were two methacrylate groups per molecule of Epon 828™ resin. GPC results indicated a large single vinyl ester peak at 14.45 min and a small peak at 18.5 minutes representing catalyst, impurities, and unreacted methacrylic acid. GPC and NMR results indicate that the molecular weight of the vinyl ester was 540 g/mol.

All of the various aspects of the invention may also employ a free-radical inhibitor, such as hydroquinone, to reduce or prevent gelation of the reaction mixture.

Without being bound by theory, the present invention may be used to reduce VOC emissions by (1) lowering the VOC content of the resultant resin, (2) binding more of the reactive diluent into the resin to reduce the amount of reactive diluent that can volatilize, or (3) both (1) and (2).

EXAMPLES OF MULTI-MODAL VINYL ESTER RESINS

Example 27

A bimodal blend of vinyl ester monomers was prepared by methacrylation of a blend of Epon 828™ and Epon 1001F™. 115.8 g Epon 828™ was added to the reactor. 99.8 g styrene was added to the reaction system to reduce the viscosity of the reaction mixture. Hydroquinone in the amount of 0.60 g was added to inhibit polymerization. The reaction vessel was sealed and stirred vigorously with the mechanical mixer while the temperature was increased to 70° C. Epon 1001F™ was added in 10 increments, 6 minutes apart. The total Epon 1001F™ added was 283.5 g. The reaction temperature was raised to 90° C., completely dissolving the Epon 1001 F™ resin by 1 hr and 2 min after initially adding the Epon 1001F™. A mixture of methacrylic acid (99.7 g) and AMC-2 (5.0 g) was then added to the reactor. After 1 hr and 53 min, the acid number of the vinyl ester portion of the reaction sample (not including the 16.5 wt % styrene) was 5.7. GPC results showed the presence of two incompletely resolved vinyl ester peaks with the high molecular weight peak occurring at 13.27 min and the low molecular weight vinyl ester peak occurring at 14.45 min. The relative areas of the vinyl ester peaks indicated that the resin contained 71 wt % vinyl ester Epon 1001F™. The GPC trace showed a significant peak at 18.5 min resulting from the styrene. The area of the styrene peak relative to the areas of the vinyl ester peaks indicated that the resin contained 16.5 wt % styrene. NMR results indicated that 1.99 methacrylate groups were present per epoxy backbone unit, and the resin contained 16.6 wt % styrene.

Example 28

A bimodal blend of vinyl ester monomers was prepared by methacrylation of a blend of Epon 828™ and Epon 1004F™. 175.1 g Epon 828™ was added to the reactor. 101.8 g styrene was added to the reaction system to reduce the viscosity of the reaction mixture. Hydroquinone in the amount of 0.616 g was added to inhibit polymerization. The reaction vessel was sealed and stirred vigorously with the mechanical mixer while the temperature was increased to 70° C. Epon 1004F™ was added in 10 increments, 6 minutes apart. The total Epon 1004F™ added was 232.1 g. The reaction temperature was raised to 90° C., completely dissolving the Epon 1004F™ resin by 1 hr and 10 min after initially adding the Epon 1004F™. A mixture of methacrylic acid (105.1 g) and AMC-2 (5.12 g) was then added to the reactor. After 2 hrs and 10 min, the acid number of the vinyl ester portion of the reaction sample (not including the styrene content) was 3.5. GPC results showed the presence of two fully resolved vinyl ester peaks with the high molecular weight peak occurring at 12.45 min and the low molecular weight vinyl ester peak occurring at 14.45 min. The relative areas of the vinyl ester peaks indicated that the resin contained 57 wt % vinyl ester Epon 1004F™. The GPC trace showed a significant peak at 18.5 min resulting from the styrene. The area of the styrene peak relative to the areas of the vinyl ester peaks indicated that the resin contained 16.4 wt % styrene. NMR results indicated that 1.98 methacrylate groups were present per epoxy backbone unit, and the resin contained 16.3 wt % styrene.

Example 29

A bimodal blend of vinyl ester monomers was prepared by methacrylation of a blend of Epon 828™ and Epon 1007F™. 200.0 g Epon 828™ was added to the reactor. 120.0 g styrene was added to the reaction system to reduce the viscosity of the reaction mixture. Hydroquinone in the amount of 0.606 g was added to inhibit polymerization. The reaction vessel was sealed and stirred vigorously with the mechanical mixer while the temperature was increased to 90° C. Epon 1007F™ was added in 10 increments, 6 minutes apart. The total Epon 1007F™ added was 200.0 g. The reaction temperature was raised to 100° C., completely dissolving the Epon 1007F™ resin by 55 min after initially adding the Epon 1007F™. A mixture of methacrylic acid (103.2 g) and AMC-2 (5.0 g) was then added to the reactor. After 2 hrs and 14 min, the acid number of the vinyl ester portion of the reaction sample (not including the styrene content) was 6.1. GPC results showed the presence of two fully resolved vinyl ester peaks with the high molecular weight peak occurring at 12.05 min and the low molecular weight vinyl ester peak occurring at 14.45 min. The relative areas of the vinyl ester peaks indicated that the resin contained 50 wt % vinyl ester Epon 1007F™. The GPC trace showed a significant peak at 18.5 min resulting from the styrene. The area of the styrene peak relative to the areas of the vinyl ester peaks indicated that the resin contained 19.1 wt % styrene. NMR results indicated that 1.97 methacrylate groups were present per epoxy backbone unit, and the resin contained 19.3 wt % styrene.

Example 30

A bimodal blend of vinyl monomers was prepared by methacrylation of a blend of Epon 828™ and Epon 1009F™. 200.9 g Epon 828 was added to the reactor. 120.4 g styrene was added to the reaction system to reduce the viscosity of the reaction mixture. Hydroquinone in the amount of 0.600 g was added to inhibit polymerization. The reaction vessel was sealed and stirred vigorously with the mechanical mixer while the temperature was increased to 90° C. Epon 1004F™ was added in 10 increments, 6 minutes apart. The total Epon 1009F™ added was 200.9 g. The reaction temperature was raised to 100° C., completely dissolving the 1009F resin by 1 hr and 10 min after initially adding the Epon 1004F™. A mixture of methacrylic acid (101.2 g) and AMC-2 (5.00 g) was then added to the reactor. After 1 hr and 32 min, the acid number of the vinyl ester portion of the reaction sample (not including the styrene content) was 6.3. GPC results showed the presence of two fully resolved vinyl ester peaks with the high molecular weight peak occurring at 11.9 min and the low molecular weight vinyl ester peak occurring at 14.45 min. The relative areas of the vinyl ester peaks indicated that the resin contained 50 wt % vinyl ester Epon 1009F™. The GPC trace showed a significant peak at 18.5 min resulting from the styrene. The area of the styrene peak relative to the areas of the vinyl ester peaks indicated that the resin contained 19.2 wt % styrene. NMR results indicated that 1.98 methacrylate groups were present per epoxy backbone unit, and the resin contained 19.1 wt % styrene.

Example 31

Styrene in the amount of 1.66 g was added to 9.16 g of the resin formulated in Example 27, resulting in a resin composition of VE 828/1001F 29/71 with 35 wt % styrene. The resin viscosity was measured to be 568 cP at 30° C. using a Brookfield viscometer.

Example 32

Styrene in the amount of 25.9 g was added to 79.8 g of the resin formulated in Example 27, resulting in a resin composition of VE 828/1001F 29/71 with 37 wt % styrene. Cobalt naphthenate in the amount of 0.39 g followed by 1.56 g Trigonox was dissolved into the resin. The resin was poured into a metal rectangular mold and allowed to cure at room temperature. The resin gelled within 20 minutes, but was allowed to cure overnight. The resulting polymer was stiff and hard. The sample was postcured at 135° C. for 2 hrs. DMA results indicated the sample had $T_g$ of 129° C. Fracture toughness measurements resulted in an average $G_{IC}$ of 302 J/m$^2$. Flexural testing resulted in a modulus a 3.22 GPa and strength of 129 MPa.

Example 33

A resin was formulated using 7.64 g of the vinyl ester Epon 828™ as prepared in Example 16, and 6.92 g of the vinyl ester resin prepared in Example 28. 4.6 g additional styrene was mixed into the resin, resulting in a resin composition of VE 828/1004F 75/25 with 30 wt % styrene. The resin viscosity was measured to be 436 cP at 30° C. using a Brookfield viscometer.

Example 34

A resin was formulated using 40.8 g vinyl ester Epon 828™ formulated in Example 16 and 37.0 g of the vinyl resin prepared in Example 28. 26.1 g additional styrene was mixed into the resin, resulting in a resin composition of VE 828/1004F 75/25 with 31 wt % styrene. Cobalt naphthenate in the amount of 0.39 g followed by 1.56 g Trigonox was dissolved into the resin. The resin was poured into a metal rectangular mold and allowed to cure at room temperature. The resin gelled within 20 minutes, but was allowed to cure overnight. The resulting polymer was stiff and hard. A rectangular piece of the sample was removed using a rotary saw. Dynamic mechanical tests indicate a modulus of 2.2 GPa at 30° C. The rest of the sample was post-cured at 135° C. for 2 hrs. DMA results indicated the sample had a $T_g$ of 143° C. Fracture toughness measurements resulted in an average $G_{IC}$ of 198 J/m$^2$. Flexural testing resulted in a modulus a 3.67 GPa and strength of 132 MPa.

Example 35

A resin was formulated using 20.5 g vinyl ester Epon 828™ formulated in Example 16 and 19.2 g of the vinyl resin prepared in Example 28. 13.3 g additional styrene was mixed into the resin, resulting in a resin composition of VE 828/1004F 75/25 with 31 wt % styrene. 0.80 g Trigonox was dissolved into the resin. The resin was poured into a metal rectangular mold and cured at 70C. The resin gelled within 10 minutes, but was allowed to cure for a full two hours. The resulting polymer was stiff and hard. Dynamic mechanical tests indicated a modulus of 2.5 GPa at 30° C. The rest of the sample was postcured at 135° C. for 2 hrs. DMA results indicated the sample had a modulus of 2.8 GPa and a $T_g$ of 144° C.

Example 36

A resin was formulated using 0.64 g vinyl ester Epon 828™ formulated in Example 16 and 14.86 g of the vinyl ester resin prepared in Example 29. 7.55 g additional styrene was mixed into the resin, resulting in a resin composition of VE 828/1007F 53/47 with 45 wt % styrene. The resin viscosity was measured to be 300 cP at 30° C. using a Brookfield viscometer.

Example 37

A resin was formulated using 2.8 g vinyl ester Epon 828™ formulated in Example 16 and 65.8 g of the vinyl ester resin prepared in Example 29. 33.4 g additional styrene was mixed into the resin, resulting in a resin composition of VE 828/1007F 53/47 with 45 wt % styrene. Cobalt naphthenate in the amount of 0.39 g followed by 1.52 g Trigonox was dissolved into the resin. The resin was poured into a metal rectangular mold and allowed to cure at room temperature. The resin gelled within 20 minutes, but was allowed to cure overnight. The resulting polymer was stiff and hard. The sample was postcured at 135° C. for 2 hrs. DMA results indicated the sample had $T_g$ of 127° C. Fracture toughness measurements resulted in an average $G_{IC}$ of 293 J/m$^2$. Flexural testing resulted in a modulus a 2.8 GPa and strength of 124 MPa.

Example 38

A resin was formulated using 9.90 g vinyl ester Epon 828™ formulated in Example 16 and 5.13 g of the vinyl resin prepared in Example 30. 6.78 g additional styrene was mixed into the resin, resulting in a resin composition of VE 828/1009F 85/15 with 35 wt % styrene. The resin viscosity was measured to be 156 cP at 30° C. using a Brookfield viscometer.

Example 39

A resin was formulated using 46.2 g vinyl ester Epon 828™ formulated in Example 16 and 24.0 g of the vinyl ester resin prepared in Example 30. 31.7 g additional styrene was mixed into the resin, resulting in a resin composition of VE 828/1009F 85/15 with 35 wt % styrene. Cobalt naphthenate in the amount of 0.38 g followed by 1.52 g Trigonox was dissolved into the resin. The resin was poured into a metal rectangular mold and allowed to cure at room temperature. The resin gelled within 20 minutes, but was allowed to cure overnight. The resulting polymer was stif and hard. The sample was postcured at 135° C. for 2 hrs. DMA results indicated the sample had $T_g$ of 133° C. Fracture toughness measurements resulted in an average $G_{IC}$ of 191 J/m$^2$. Flexural testing resulted in a modulus a 2.7 GPa and strength of 123 MPa.

Example 40

A resin was formulated using 3.52 g vinyl ester Epon 828™ formulated in Example 16, 5.93 g of the vinyl ester resin prepared in Example 28, and 7.0 g of the vinyl resin prepared in Example 30. 5.30 g additional styrene was mixed into the resin, resulting in a resin composition of VE 828/1004F/1009F 60/20/20 with 35 wt % styrene. The resin viscosity was measured to be 670 cP at 30° C. using a Brookfield viscometer.

Example 41

A resin was formulated using 16.2 g vinyl ester Epon 828™ formulated in Example 16, 27.3 g of the vinyl ester resin prepared in Example 28, and 32.2 g of the vinyl ester resin prepared in Example 30. 24.4 g additional styrene was mixed into the resin, resulting in a resin composition of VE 828/1004F/1009F 60/20/20 with 35 wt % styrene. Cobalt naphthenate in the amount of 0.38 g followed by 1.5 g Trigonox was dissolved into the resin. The resin was poured into a metal rectangular mold and allowed to cure at room temperature. The resin gelled within 20 minutes, but was allowed to cure overnight. The resulting polymer was stiff and hard. A rectangular piece of the sample was removed using a rotary saw. The sample was postcured at 135° C. for 2 hrs. DMA results indicated the sample had a modulus of 2.8 GPa and a $T_g$ of 129° C.

Example 42

The vinyl ester Epon 828™/1004F/Epon 1004F™ resin formulated in example 33 was placed in a 20 mL vial and allowed to sit at room temperature in a dark cabinet. The resin so far has managed to last for 2 years without spontaneous gelation.

Example 43

A resin was prepared by mixing 10 g of the vinyl ester resin prepared in Example 28 with 2.85 g styrene for a final composition of VE 828/1004F 42/58+35 wt % styrene. A sample from this resin was placed in a thermogravimetric analyzer. The mass loss resulting from styrene evaporation was measured as a function of time for 3 days at 40° C. The mass loss of styrene was 85% of the initial styrene mass, while the mass loss of high volatility non-bimodal blends was more than 95% of the initial styrene mass.

Example 44

A resin was prepared by mixing 200 g of a resin prepared in a manner similar to that in Example 29 with 163 g of a vinyl ester Epon 828™ resin prepared by the procedure of Example 16. Styrene in the amount of 138 g was added to the resin. Cobalt naphthenate was added in the amount of 0.75 g followed by 7.5 g Trigonox. A composite was prepared with 20 layers of 8 oz. E-glass universally sized woven mats using vacuum assisted resin transfer molding. The resin filled the part in 10 minutes. The sample was allowed to cure under vacuum all night. The finished part was hard and stiff.

Example 45

Other catalyst contents were used to prepare the vinyl ester resins. A bimodal blend of vinyl ester monomers was prepared by methacrylation of a blend of Epon828™ and Epon 1007F™. 300.1 g Epon 828™ was added to the reactor. 188.8 g styrene was added to the reaction system to reduce the viscosity of the reaction mixture. Hydroquinone in the amount of 0.944 g was added to inhibit polymerization. The reaction vessel was sealed and stirred vigorously with the mechanical mixer while the temperature was increased to 90° C. Epon 1007F™ was added in 10 increments, 6 minutes apart. The total Epon 1007F™ added was 300.3 g. The reaction temperature was raised to 100° C., completely dissolving the Epon 1007F™ resin by 55 min after initially adding the Epon 1007F™. A mixture of methacrylic acid (154.8 g) and AMC-2 (3.76 g, which is equivalent to 0.5 wt %) was then added to the reactor. After 6 hrs, the acid number of the vinyl ester portion of the reaction sample (not including the styrene content) was 9. GPC results showed the presence of two fully resolved vinyl ester peaks with the high molecular weight peak occurring at 12.05 min and the low molecular weight vinyl ester peak occurring at 14.45 min. The relative areas of the vinyl ester peaks indicated that the resin contained 50 wt % vinyl ester/Epon 1007F™. The GPC trace showed a significant peak at 18.5 min resulting from the styrene. The area of the styrene peak relative to the areas of the VE peaks indicated that the resin contained 199 wt % styrene. GPC, NMR and acid number titration (ASTM D1652-90, Procedure B) results indicate that the molecular weight of the vinyl esters of Epon 1007F™ was 4154 g/mol. The bimodal molecular weight distribution was 50% 540 g/mol and 50% 4154 g/mol.

All of the various aspects of the invention may also employ a free-radical inhibitor, such as hydroquinone, to reduce or prevent gelation of the reaction mixture.

The foregoing detailed description of the invention has been presented for the purpose of illustration and description only and is not to be construed as limiting the invention in any way. The skilled person will realize that many modifications and variations can be made within the scope of the present invention.

What is claimed is:

1. [Vinyl] *A vinyl* ester [resins having a defined multi-modal molecular weight distribution] *resin* comprising a reaction product of a reaction mixture comprising at least one low molecular weight vinyl ester that is derived from *only a vinyl carboxylic acid or a blend of vinyl carboxylic acids and* an epoxy resin *or a combination of epoxy resins* that is liquid or crystalline at 25° C. and at least one high molecular weight vinyl ester that is derived from *only a vinyl carboxylic acid or a blend of vinyl carboxylic acids and* an epoxy resin *or a combination of epoxy resins* that is amorphous and solid at 25° C.[;] *selected from the group consisting of an epoxy resin derived from bisphenol A, an epoxy resin derived from hexafluorobisphenol A, an epoxy resin derived from bisphenol E, an epoxy resin derived from bisphenol F, an epoxy resin derived from tetramethyl bisphenol E, an epoxy resin derived from tetramethyl bisphenol F, an epoxy resin derived from bisphenol M, an epoxy resin derived from bisphenol C, an epoxy resin derived from bisphenol P, an epoxy resin derived from bisphenol Z, an epoxy resin derived from methacrylates of ethoxylated bisphenols, an epoxy resin derived from acrylates of ethoxylated bisphenols, epoxy novolacs, acrylates of tris-hydroxyphenylmethane glycidyl ether, ethoxy phenol novolacs, an epoxy resin derived from ethoxylated tris-hydroxyphenylmethane and brominated versions of these epoxy resins,* and from 0% up to 60% by weight of a reactive diluent, wherein said vinyl ester resin has a [defined] multi-modal molecular weight distribution.

2. [Vinyl] *The vinyl* ester [resins] *resin* as claimed in claim 1, wherein [at least one low molecular weight] *said* vinyl ester [comprises 5-65% by weight, of the overall resin weight] *resin has a bi-modal molecular weight distribution*.

[3. Vinyl ester resins as claimed in claim 1, wherein at least one high molecular weight vinyl ester comprises 5-65% by weight, of the overall resin weight.]

4. [Vinyl] *The vinyl* ester [resins] *resin* as claimed in claim [1] *2*, wherein the at least one low molecular weight vinyl ester comprises 5-65% by weight, of the overall resin weight, and at least one high molecular weight vinyl ester comprises 5-65% by weight, of the overall resin weight.

[5. Vinyl ester resins as claimed in claim 4, wherein the reaction mixture comprises 1% to 60% by weight of a reactive diluent.]

6. [Vinyl] *The vinyl* ester [resins] *resin* as claimed in claim [5] *4*, wherein the *reaction mixture comprises 1% to 40% by weight of the* reactive diluent *and the reactive diluent* is selected from the group consisting of fatty acid monomers, styrene, ortho-methylstyrene, para-methylstyrene, 2-hydroxymethacrylate, methyl methacrylate, ethyl methacrylate, butyl methacrylate, methyl acrylate, cyclohexyl methacrylate, and isobornyl methacrylate.

7. [Vinyl] *The vinyl* ester [resins] *resin* as claimed in claim 6, comprising up to [40] *30%* by weight of a reactive diluent.

8. [Vinyl] *The vinyl* ester [resins] *resin* as claimed in claim 6, comprising up to [30] *20%* by weight of a reactive diluent.

[9. Vinyl ester resins as claimed in claim 6, comprising up to 20% by weight of a reactive diluent.]

10. [Vinyl] *The vinyl* ester [resins] *resin* as claimed in claim [6] *2*, wherein *the reaction mixture comprises 1% to 60% by weight of the reactive diluent and* the reactive diluent comprises at least one fatty acid monomer.

11. [Vinyl] *The vinyl* ester [resins] *resin* as claimed in claim 6, wherein the reactive diluent comprises styrene.

12. [Vinyl] *The vinyl* ester [resins] *resin* as claimed in claim [1] *2*, wherein the *low molecular weight* vinyl [esters] *ester and high molecular weight vinyl ester* are independently selected from the group consisting of acrylic vinyl esters and alkyl-acrylic vinyl esters.

13. [Vinyl] *The vinyl* ester [resins] *resin* as claimed in claim [1] *2*, wherein the *low molecular weight* vinyl [esters] *ester and high molecular weight vinyl ester* are independently selected from bisphenol vinyl esters.

14. [Vinyl] *The vinyl* ester [resins] *resin* as claimed in claim [1] *2*, wherein the vinyl ester resin has a viscosity from about 30 cP to about 2000 cP at 25° C. *and a glass transition temperature from about 60° C. to about 200° C.*

15. [Vinyl] *The vinyl* ester [resins] *resin* as claimed in claim [1] *2*, wherein the vinyl ester resin has a viscosity from about 30 cP to about 500 cP at 25° C. *and a glass transition temperature from about 60° C. to about 200° C.*

[16. Vinyl ester resins as claimed in claim 1, wherein the vinyl ester resins have a glass transition temperature from about 60° C. to about 200° C.]

[17. Vinyl ester resins as claimed in claim 14, wherein the vinyl ester resins have a glass transition temperature from about 60° C. to about 200° C.]

18. A method for the preparation of a vinyl ester resin [having a defined multi-modal molecular weight distributions], said method comprising the step of: reacting at least one low molecular weight vinyl ester that is derived from *only a vinyl carboxylic acid or a blend of vinyl carboxylic acids and* an epoxy resin *or a combination of epoxy resins* that is liquid or crystalline at 25 C. [and], at least one high molecular weight vinyl ester that is derived from *only a vinyl carboxylic acid or a blend of vinyl carboxylic acids and* an epoxy resin *or*

*a combination of epoxy resins* that is amorphous and solid at 25° C. *selected from the group consisting of an epoxy resin derived from bisphenol A, an epoxy resin derived from hexafluorobisphenol A, an epoxy resin derived from bisphenol E, an epoxy resin derived from bisphenol F, an epoxy resin derived from tetramethyl bisphenol E, an epoxy resin derived from tetramethyl bisphenol F, an epoxy resin derived from bisphenol M, an epoxy resin derived from bisphenol C, an epoxy resin derived from bisphenol P, an epoxy resin derived from bisphenol Z, an epoxy resin derived from methacrylates of ethoxylated bisphenols, an epoxy resin derived from acrylates of ethoxylated bisphenols, epoxy novolacs, acrylates of tris-hydroxyphenylmethane glycidyl ether, ethoxy phenol novolacs, an epoxy resin derived from ethoxylated tris-hydroxyphenylmethane and brominated versions of these epoxy resins and from 0% up to 60% by weight of a reactive diluent*, at a temperature and for a time sufficient to form said [blend of] vinyl ester [monomers] *resin* having a [defined] multi-modal molecular weight distribution.

19. A method as claimed in claim 18, wherein the [at least one low molecular weight] vinyl ester [comprises from about 5 to about 65% by weight, of the overall resin weight, and at least one high molecular weight vinyl ester comprises from about 5 to about 65% by weight of the overall resin weight] *resin has a bi-modal molecular weight distribution*.

20. A method as claimed in claim 19, wherein [said reacting step further comprises reacting up to about 60% by weight of a reactive diluent with] said at least one low molecular weight vinyl ester *comprises from about 5% to about 65% by weight, of the overall resin weight,* and said at least one high molecular weight vinyl ester *comprises from about 5% to about 65% by weight of the overall resin weight*.

21. A method as claimed in claim 20, wherein *in* said reacting step [comprises reacting up] *from about 1%* to about 40% by weight of a [reacting] *reactive* diluent *is reacted* with said at least one low molecular weight vinyl ester and said at least one high molecular weight vinyl ester.

22. A method as claimed in claim [20] *21*, wherein [said reacting step comprises reacting] up to about 30% by weight of [a reacting] *the reactive* diluent *is reacted* with said at least one low molecular weight vinyl ester and said at least one high molecular weight vinyl ester.

23. A method as claimed in claim [20] *21*, wherein [said reacting step comprises reacting] up to about 20% by weight of [a reacting] *the reactive* diluent *is reacted* with said at least one low molecular weight vinyl ester and said at least one high molecular weight vinyl ester.

24. A method as claimed in claim [20] *21*, wherein the reactive diluent comprises at least one fatty acid monomer.

25. A method as claimed in claim [20] *21*, wherein the reactive diluent comprises styrene.

26. A method as claimed in claim [20] *21*, wherein the reactive diluent comprises a reactive diluent selected from the group consisting of styrene, methyl methacrylate, fatty acid monomers, cyclohexyl methacrylate, 2-hydroxyethyl-methacrylate, para-methyl styrene, ortho-methyl styrene, isobomyl methacrylate, and mixtures thereof.

*27. A method of making a cured polymer composition, said method comprising the step of:*

*curing a curable vinyl ester resin composition having a viscosity from about 30 cP to about 2000 cP at 25° C., said vinyl ester resin composition having a multi-modal molecular weight distribution and comprising a reaction product of a reaction mixture comprising at least one low molecular weight vinyl ester that is derived from an epoxy resin or a combination of epoxy resins that is liquid or crystalline at 25° C., at least one high molecular weight vinyl ester that is derived from an epoxy resin or a combination of epoxy resins that is amorphous and solid at 25° C., and from 0% up to 60% by weight of a reactive diluent.*

*28. A method as claimed in claim 27, wherein said curable vinyl ester resin composition further comprises styrene.*

*29. A method as claimed in claim 27, wherein said vinyl ester resin has a bi-modal molecular weight distribution.*

*30. A method as claimed in claim 27, wherein the reaction mixture comprises 1% to 40% by weight of the reactive diluent and the reactive diluent is selected from the group consisting of fatty acid monomers, styrene, ortho-methylstyrene, para-methylstyrene, 2-hydroxymethacrylate, methyl methacrylate, ethyl methacrylate, butyl methacrylate, methyl acrylate, cyclohexyl methacrylate, and isobornyl methacrylate.*

*31. A method as claimed in claim 27, wherein the reaction mixture comprises up to 30% by weight of a reactive diluent.*

*32. A method as claimed in claim 27, wherein the reaction mixture comprises up to 20% by weight of a reactive diluent.*

*33. A method as claimed in claim 27, wherein said cured polymer composition has a fracture toughness of at least 191 $J/m^2$.*

*34. A method as claimed in claim 33 wherein said cured polymer composition has a fracture toughness of from 191 $J/m^2$ to 500 $J/m^2$.*

*35. A method as claimed in claim 27, wherein said cured polymer composition is a composite.*

*36. A method as claimed in claim 27, wherein said vinyl ester resin has a glass transition temperature from about 60° C. to about 200° C.*

*37. A method as claimed in claim 27, wherein said curable vinyl ester resin composition has a viscosity from about 156 cP to about 670 cP at 25° C.*

*38. A method of making a cured polymer composition, said method comprising the step of:*

*curing a curable vinyl ester resin composition having a multi-modal molecular weight distribution, said vinyl ester resin composition being derived from only a vinyl carboxylic acid or a blend of vinyl carboxylic acids and an epoxy resin or a combination of epoxy resins that is liquid or crystalline at 25° C. and at least one high molecular weight vinyl ester that is derived from only a vinyl carboxylic acid or a blend of vinyl carboxylic acids and an epoxy resin or a combination of epoxy resins that is amorphous and solid at 25° C. selected from the group consisting of an epoxy resin derived from bisphenol A, an epoxy resin derived from hexafluorobisphenol A, an epoxy resin derived from bisphenol E, an epoxy resin derived from bisphenol F, an epoxy resin derived from tetramethyl bisphenol E, an epoxy resin derived from tetramethyl bisphenol F, an epoxy resin derived from bisphenol M, an epoxy resin derived from bisphenol C, an epoxy resin derived from bisphenol P, an epoxy resin derived from bisphenol Z, an epoxy resin derived from methacrylates of ethoxylated bisphenols, an epoxy resin derived from acrylates of ethoxylated bisphenols, epoxy novolacs, acrylates of tris-hydroxyphenylmethane glycidyl ether, ethoxy phenol novolacs, an epoxy resin derived from ethoxylated tris-hydroxyphenylmethane and brominated versions of these epoxy resins.*

*39. A method as claimed in claim 38, wherein said vinyl ester resin has a bi-modal molecular weight distribution.*

*40. A method as claimed in claim 38, wherein said vinyl ester resin composition further comprises styrene.*

*41. A method as claimed in claim 38, wherein said cured polymer composition is a composite.*

*42. A method as claimed in claim 38, wherein the reaction mixture comprises 1% to 40% by weight of the reactive diluent and the reactive diluent is selected from the group consisting of fatty acid monomers, styrene, ortho-methylstyrene, para-methylstyrene, 2-hydroxymethacrylate, methyl methacrylate, ethyl methacrylate, butyl methacrylate, methyl acrylate, cyclohexyl methacrylate, and isobornyl methacrylate.*

*43. A method as claimed in claim 38, wherein the reaction mixture comprises up to 30% by weight of a reactive diluent.*

*44. A method as claimed in claim 38, wherein the reaction mixture comprises up to 20% by weight of a reactive diluent.*

* * * * *